No. 796,939. PATENTED AUG. 8, 1905.
F. SCHWERDTFEGER.
BRICK PRESS.
APPLICATION FILED MAR. 7, 1905.

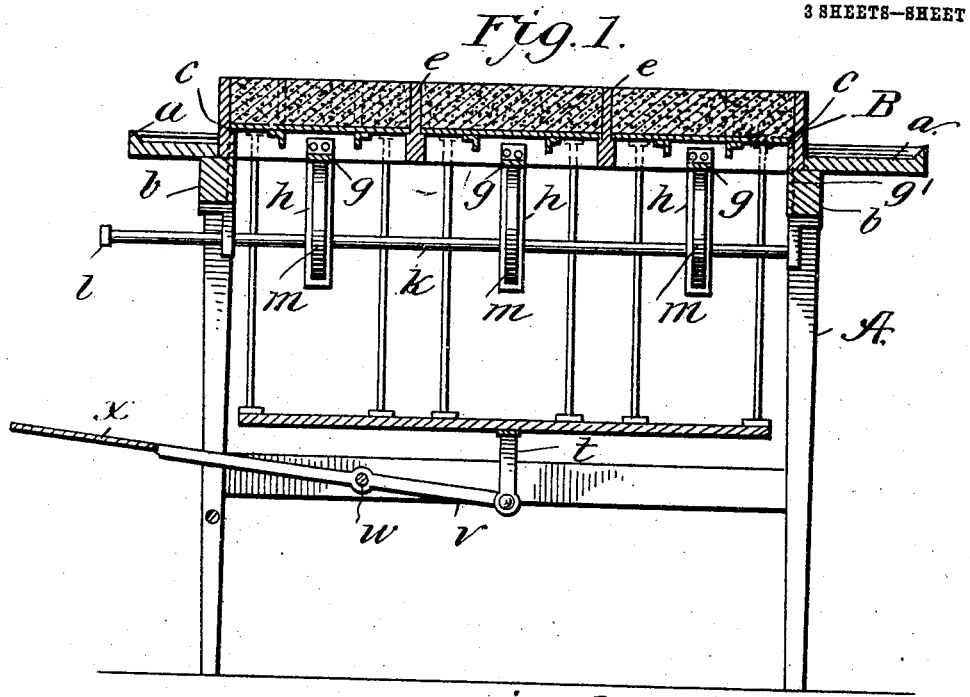
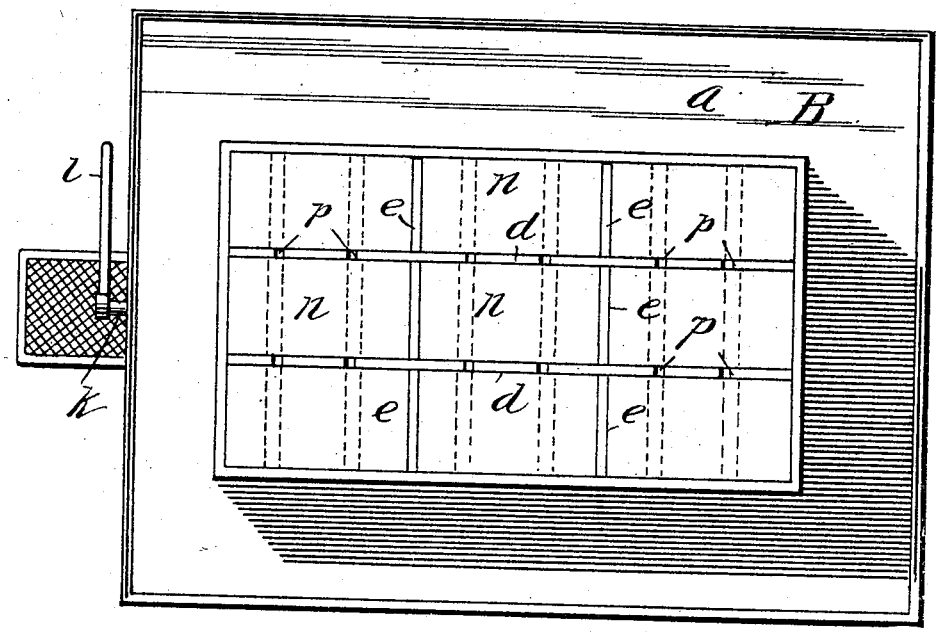

3 SHEETS—SHEET 2.

Witnesses
Geo. Ackman Jr.
C. C. Hines.

Inventor
Felix Schwerdtfeger,
By Victor J. Evans
Attorney

ANDREW. B. GRAHAM CO., PHOTO-LITHOGRAPHERS, WASHINGTON, D. C.

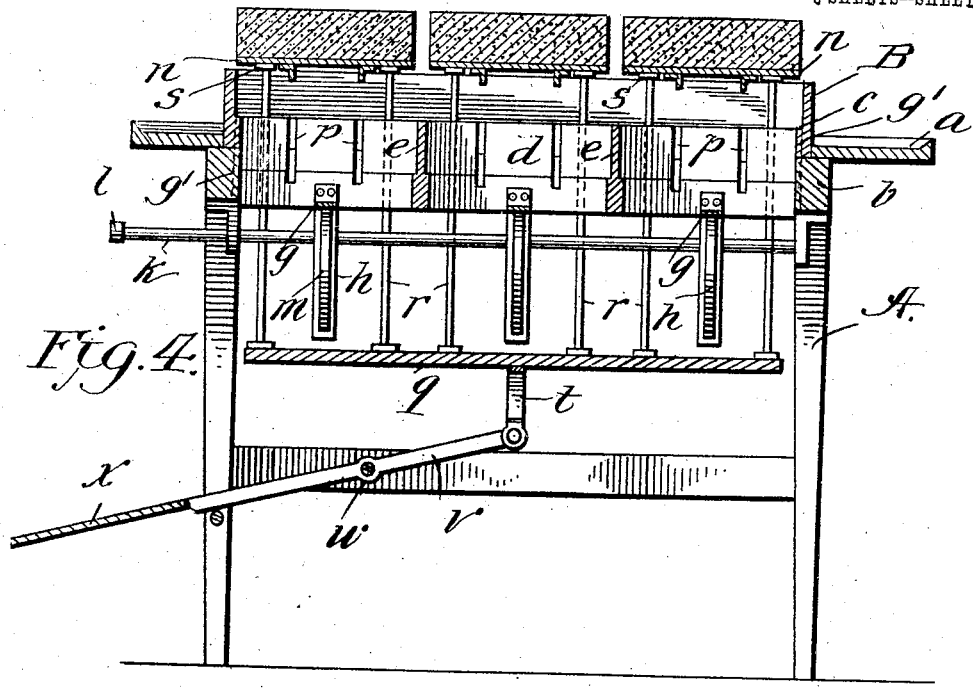
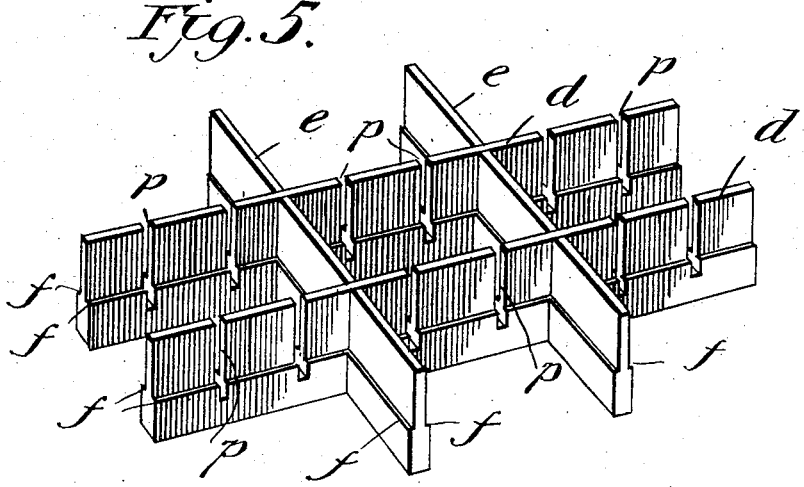

UNITED STATES PATENT OFFICE.

FELIX SCHWERDTFEGER, OF POSEN, GERMANY, ASSIGNOR OF ONE-HALF TO WILLIAM GRUNAN, OF ENID, MONTANA.

BRICK-PRESS.

No. 796,939.    Specification of Letters Patent.    Patented Aug. 8, 1905.

Application filed March 7, 1905. Serial No. 248,842.

*To all whom it may concern:*

Be it known that I, FELIX SCHWERDTFEGER, a subject of the German Emperor, residing at Posen, Germany, have invented new and useful Improvements in Brick-Presses, (for which I have obtained Letters Patent, No. 156,498, in Germany,) of which the following is a specification.

This invention relates to apparatus for molding bricks or blocks of cement, concrete, clay, or other material, In the manufacture of bricks it is desirable that they shall have sharp edges or corners after being removed from the molds, and to insure this it is necessary to be very careful in separating the molds from the bricks, and this is particularly the case when cement or concrete is the material employed.

The object of my invention is to provide an apparatus in which a number of bricks or blocks can be molded at one time and all of them be simultaneously removed from the molds without danger of injuring their edges and corners.

In carrying out my invention I make provision for withdrawing some of the walls of the mold-compartments downwardly away from the bricks or blocks and for then elevating the bricks or blocks on removable supports above the stationary walls of the mold-compartments.

A preferred embodiment of my invention will be fully described hereinafter, reference being had to the accompanying drawings, in which—

Figure 3:
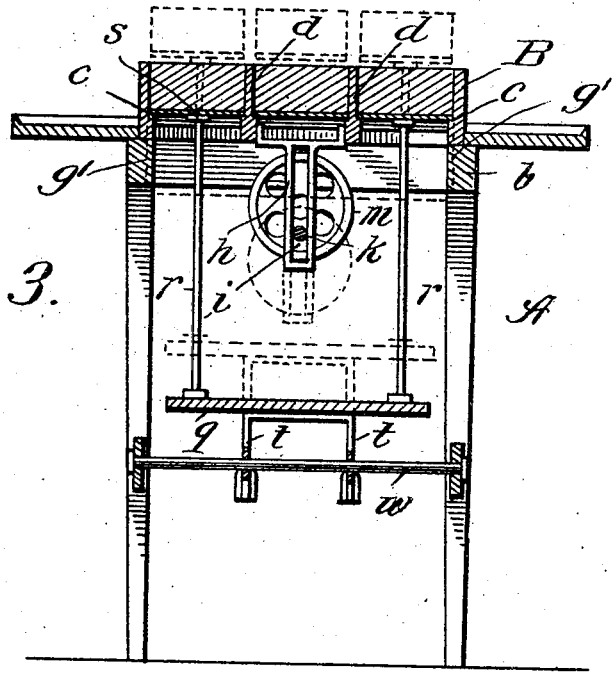
Figure 6:
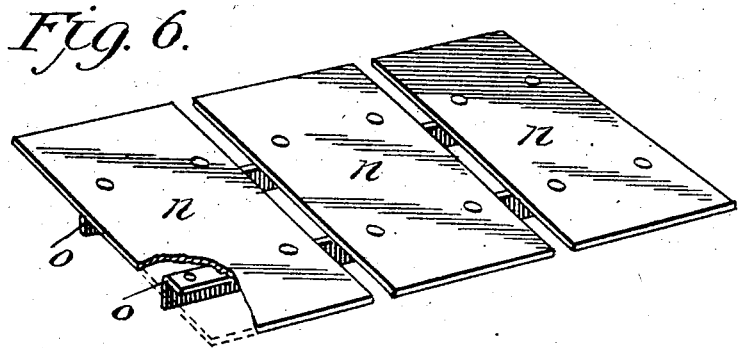
Figure 7:
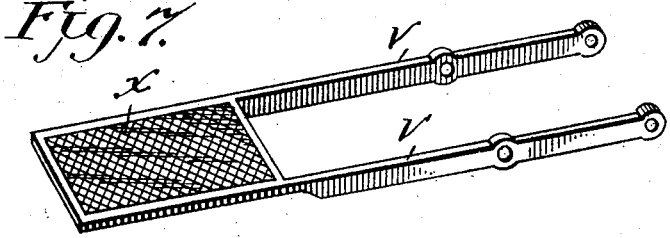

Figure 1 is a vertical longitudinal section of an apparatus, showing the several parts in position to mold the bricks or blocks. Fig. 2 is a top plan view thereof. Fig. 3 is a vertical transverse section. Fig. 4 is a view similar to Fig. 1, showing the inner partition-walls of the mold-box lowered and the bricks or blocks elevated above the walls of the mold-box. Fig. 5 is a perspective view of the partition-walls of the mold-box. Fig. 6 is a perspective view, partly broken away, of a set of bottom boards. Fig. 7 is a perspective view of a foot-lever for elevating the bricks or blocks.

The supporting-frame is indicated as a whole by A and is provided with a top or table $a$, the middle portion of which is cut away to form a rectangular opening into which a rectangular mold-box B is fitted and supported by the top rails $b$ of the frame. The mold-box will preferably be fastened in some manner to prevent its upward movement when the bricks are elevated. The walls of the mold-box are provided with a shoulder $c$ on their inner surfaces, as clearly shown in Figs. 1, 3, and 4. In order to divide the mold-box into a number of compartments, I provide a series of longitudinal partitions $d$ and a series of transverse partitions $e$—in the present instance two of each being shown—thereby dividing the box B into nine mold-compartments. Either the longitudinal or the transverse partitions might be secured to the mold-box B and the others be movable, but in the present case I have shown the partitions connected together to form a grid, as shown in Fig. 5, and they are intended to move together, thereby making all of the partition-walls of the mold-box movable, while the outer walls thereof will be stationary. I do not, however, propose to limit myself to such arrangement, as it is evident only the longitudinal partitions or the transverse partitions might be movable, and my invention is intended to cover the movability of some of the walls of each mold-compartment. Each partition is provided with a shoulder $f$ on each side, which will register with the shoulders $c$ of the mold-box when the parts are in the position shown in Fig. 1. These partitions are designed to fit snugly but freely within the mold-box B, and the walls of the latter will have vertical grooves cut in them below the shoulders $c$ to receive the ends of the partitions. These grooves are indicated by the dotted lines $g'$ in Figs. 1 and 4, and they may also extend through the top rails $b$ of the frame, if necessary, and will form guides or ways in which the partitions may move vertically. Some mechanism must be provided for supporting and moving these partitions, and in the present case I have shown the two longitudinal partitions $d$ connected together on their lower edges by bars $g$, three being shown, from which depend straps $h$, the sides of which are slotted, as indicated by $i$, Fig. 3. A shaft $k$ is journaled in suitable bearings on the frame A and provided with a handle $l$, Fig. 2, by which it may be turned. This shaft extends through the slots $i$ in the shaft $h$, and three eccentrics $m$ are rigidly secured to it to engage and coöperate with the respective straps $h$. By turning the shaft $k$ the eccentrics will cause the partitions to move vertically, they being shown in their highest position in Fig. 1 and in full lines in Fig. 3 and in their lowest position in Fig. 4 and in dotted lines, Fig. 3.

The mold-compartments so far described are open at top and bottom, and it is of course necessary to provide bottom boards therefor, and while separate and independent boards might be provided for each compartment I prefer to have a series of boards connected together for use in a corresponding series of compartments. In the present instance I have illustrated a series of three boards $n$ connected together. These boards are of a size to fit snugly within the mold-compartments, and they are connected together by a pair of angle-bars $o$, to the horizontal members of which they are riveted. A space is left between the middle board and each end board equal to the thickness of the partitions $d$, and these partitions are provided with slots $p$ to permit the passage of the vertical members of the angle-bars $o$. The horizontal members of the angle-bars are cut away opposite the spaces between the boards, and the three boards can thus be put in or removed from three adjacent compartments and when in will rest upon the shoulders $c$ and $f$. In the drawings the width of the slots $p$ and the thickness of the metal of the angle-bars are exaggerated for the sake of clearness. In actual practice the metal of the angle-irons need be little, if any, more than one-sixteenth of an inch in thickness and the slots $p$ of a corresponding width, so they will not be at all detrimental to the mold-compartments. It is also necessary to provide some means for elevating the bottoms above the upper edges of the mold-box B, and while various devices may be employed for this purpose in the present case I have shown a plate $q$, provided with a series of vertical rods $r$, each preferably having an enlargement or head $s$ at its upper end to engage the boards $n$. To the under side of the plate $q$ two depending arms are rigidly secured, to the lower ends of which the inner ends of the arms $v$ of a foot-lever are pivotally connected. These arms $v$ are pivoted intermediate their ends on a rod $w$, supported by the frame of the machine, and are provided at their outer ends with a connecting foot-plate $x$.

Such being the preferred construction of the apparatus, the operation is as follows: Assuming the movable parts to be in the positions indicated in Fig. 1 and the mold-compartments having been filled with the plastic material and smoothed off on the top, the operator will then turn the shaft $h$ and through the medium of the eccentrics $m$ and straps $h$ will cause the partitions $d$ and $e$ to move downwardly to the position shown in Fig. 4, which will disengage them entirely from the molded bricks, and the latter will only be in contact with the bottom boards and the sides of the mold B. The operator will then depress the outer end of the foot-lever and lift all the bottoms and the superposed bricks above the upper edges of the mold-box B, and the bottoms and bricks can be easily lifted off the rods $r$ and transported to the place where the bricks are to be dried, and the bricks can remain on the bottom boards until they have hardened sufficiently to be handled.

The apparatus is capable of use in molding bricks or building or paving blocks, and in the following claims to avoid alternative terms the words "brick" or "bricks" are intended to include any kind of building or paving block.

Without limiting myself to the precise construction illustrated and described, I claim—

1. In a brick-molding apparatus, the combination of a relatively fixed mold-box, longitudinal and transverse partitions within the mold-box to form molding-compartments, bottom boards loosely supported within the compartments, means for moving some of the walls of the molding-compartments downwardly, and means for moving the bottom boards upwardly above the top edges of the fixed walls of the molding-compartments, substantially as described.

2. In a brick-molding apparatus, the combination of a relatively fixed mold-box, longitudinal and transverse partitions connected together and loosely supported within the mold-box to form molding-compartments, bottom boards loosely supported within the compartments, means for moving said partitions downwardly, and means for moving the bottom boards upwardly above the top edges of the mold-box, substantially as described.

3. In a brick-molding apparatus, the combination of a mold-box having interior shoulders, partitions loosely fitted within the box to form compartments, said partitions having shoulders to register with those in the box, bottom boards loosely supported on said shoulders within the compartments, means for moving the partitions downwardly, and means for moving the boards upwardly, substantially as described.

4. In a brick-molding apparatus, the combination of a relatively fixed mold-box having interior horizontal shoulders and vertical grooves in its inner walls below the shoulders, partitions fitted to slide loosely in said grooves and form molding-compartments within the box, said partitions having shoulders to register with those in the box, bottom boards loosely supported on said shoulders within the compartments, means for moving the partitions downwardly, and means for moving the boards upwardly, substantially as described.

5. In apparatus for molding bricks, the combination of a stationary mold-box having vertical grooves in its inner walls and horizontally-extending shoulders, partitions fitted to slide loosely in said grooves and form molding-compartments within the box, said partitions having shoulders to register with those in the box, bottom boards loosely supported on said shoulders within the compartments means for moving the partitions downwardly, and means for moving the boards upwardly above the mold-box, substantially as described.

6. In apparatus for molding bricks, the combination of a mold-box divided into a series of molding-compartments, each having shoulders on its inner walls, bottom boards loosely supported on said shoulders within the compartments, a plate having a series of vertical rods to engage the under sides of the said boards, and a pivoted lever connected to said plate to move said plate and rods vertically and lift the bottom boards out of said compartments, substantially as described.

7. In apparatus for molding bricks, the combination of a stationary mold-box, partitions within said box dividing it into molding-compartments, said partitions having vertical slots opening out at their upper edges and a series of bottom boards connected together by bars with spaces between adjacent edges, whereby the series of boards may be moved together into or out of corresponding series of compartments, said partitions entering the spaces between the boards and the connecting-bars entering the slots in the partitions, substantially as described.

8. In apparatus for molding bricks, the combination of a stationary mold-box, partitions loosely fitted within the box to form molding-compartments, said partitions having vertical slots, bottom boards loosely supported in the compartments, bars fitting in said slots and secured to bottom boards in a plurality of adjacent compartments, means for supporting said partitions and moving them vertically, and means for supporting the bottom boards and moving them together in a vertical direction independently of the partitions, substantially as described.

In testimony whereof I affix my signature in presence of two witnesses.

FELIX SCHWERDTFEGER. [L. S.]

Witnesses:
 GUSTAV WALLOR,
 OTTO WIEDEMANN.